United States Patent
Rajaraman et al.

(10) Patent No.: US 6,366,910 B1
(45) Date of Patent: Apr. 2, 2002

(54) METHOD AND SYSTEM FOR GENERATION OF HIERARCHICAL SEARCH RESULTS

(75) Inventors: Anand Rajaraman, Seattle; Nigel Green, Bellevue, both of WA (US)

(73) Assignee: Amazon.com, Inc., Seattle, WA (US)

( * ) Notice: Subject to any disclaimer, the term of this patent is extended or adjusted under 35 U.S.C. 154(b) by 0 days.

(21) Appl. No.: 09/206,774

(22) Filed: Dec. 7, 1998

(51) Int. Cl.[7] .............................................. G06F 17/30
(52) U.S. Cl. ........................................................ 707/5
(58) Field of Search ............................................ 707/5

(56) References Cited

U.S. PATENT DOCUMENTS

| | | | | |
|---|---|---|---|---|
| 5,062,074 A | * | 10/1991 | Kleinberger ................... | 707/5 |
| 5,251,131 A | * | 10/1993 | Massand et al. ............... | 704/9 |
| 5,442,778 A | * | 8/1995 | Pedersen et al. ............... | 707/5 |
| 5,488,725 A | * | 1/1996 | Turtle et al. ................... | 707/5 |
| 5,722,418 A | * | 3/1998 | Bro ............................ | 128/732 |
| 5,787,422 A | * | 7/1998 | Tukey et al. ................... | 707/5 |
| 5,802,493 A | * | 9/1998 | Sherflott et al. ................ | 705/1 |
| 5,835,905 A | * | 11/1998 | Pirolli et al. ................... | 707/3 |
| 5,848,409 A | * | 12/1998 | Ahn ............................. | 707/3 |
| 5,897,638 A | * | 4/1999 | Lasser et al. ............... | 707/102 |
| 5,920,854 A | * | 7/1999 | Kirsch et al. .................. | 707/3 |
| 5,987,460 A | * | 11/1999 | Niwa et al. .................... | 707/6 |
| 6,011,862 A | * | 1/2000 | Doi et al. .................... | 382/132 |
| 6,029,195 A | * | 2/2000 | Herz .......................... | 709/219 |
| 6,038,560 A | * | 3/2000 | Wical ........................... | 707/5 |
| 6,195,652 B1 | * | 2/2001 | Fish ............................ | 707/2 |

* cited by examiner

*Primary Examiner*—Wayne Amsbury
(74) *Attorney, Agent, or Firm*—Perkins Coie LLP

(57) ABSTRACT

A method and system for querying hierarchically classified data. The system first receives a query request and then identifies classifications of the data that may satisfy the received query request. The system then displays the identified classifications. In response to selection of a displayed classification, the system displays sub-classifications when the selected classification has sub-classifications and displays the data within the classification when the selected classification has no sub-classifications. In another aspect, the system generates search results for items that are hierarchically classified. For classifications within the hierarchy of classifications, the system generates a search entry containing terms describing the items within that classification. The system then receives a search criteria. The system selects as initial search results those search entries whose terms most closely match the received search criteria. The system then adjusts the initial search results based on the hierarchy of classifications. This adjustment may include removing sub-classifications of a classification that is in the initial search results or adding a parent classification to replace multiple child classifications in the initial search results.

59 Claims, 17 Drawing Sheets

Travel Table 301

| ID | Category | Subcategory | Name | Destination | Orig dest... | Provider | Description |
|---|---|---|---|---|---|---|---|
|  | 31 | 237 | Hawaii Honeymoon | Maui | Seattle | Hawaii Travel | ⟨ |
|  | 31 | 240 | Australian Tour | Australia | Seattle | Outback Venture | ⟨ |
|  |  |  |  |  |  |  |  |
|  |  |  |  |  |  |  |  |
|  |  |  |  |  |  |  |  |
|  | 31 | 240 | New Zealand Tour | New Zealand | Seattle | Outback Venture | ⟨ |

*Fig. 3A*

Apparel Table

| ID | Category | Subcategory | Item Type | Brand | Name | Store | Description |
|---|---|---|---|---|---|---|---|
| | 34 | 272 | 2036 | Outback Wear | Aborigine Polo | | ∫ |
| | 35 | 279 | 2058 | Outback Wear | Aborigine T-Shirt | | ∫ |
| | 36 | 287 | 2089 | Hike On | Ultra Hike | | ∫ |

*Fig. 3B*

Browse Tree

| Id | Parent | Name | DisplayName | URLAlias | ConfigFile | Image | TitleImage | TableNameStem |
|---|---|---|---|---|---|---|---|---|
| 2 | 0 | Electronics | Electronics | /electronics/electronics.html | /electronics/browse_elec.properties | /img/electronics_icon.gif | /img/head_electronics.gif | ELECTRONICS |
| 3 | 0 | Computer Hardware | Computer Hardware | /computers/computers.html | /computers/browse_computers.properties | /img/computer_icon.gif | /img/head_computer.gif | COMPUTERS |
| 4 | 0 | Travel | Travel | /travel/travel.html | /travel/browse_travel.properties | /img/travel_icon.gif | /img/head_travel.gif | TRAVELS |
| 31 | 4 | Packaged Travel | Packaged Travel | /travel/browse_travel.html | /travel/browse_travel.properties | /img/travel_icon.gif | /img/head_travel_packaged.gif | |
| 237 | 31 | Beach and resorts | Beach and resorts | /travel/results_travel.html | /travel/results_travel.properties | /img/travel_icon.gif | /img/head_travel_pack_beach.gif | |
| 238 | 31 | Cruises | Cruises | /travel/results_travel.html | /travel/results_travel.properties | /img/travel_icon.gif | /img/head_travel_pack_cruise.gif | |
| 239 | 31 | Boating and watersports | Boating and watersports | /travel/results_travel.html | /travel/results_travel.properties | /img/travel_icon.gif | /img/head_travel_pack_boating.gif | |
| 240 | 31 | Cycling | Cycling | /travel/results_travel.html | /travel/results_travel.properties | /img/travel_icon.gif | /img/head_travel_pack_cycling.gif | |
| 241 | 31 | Hiking, climbing and trekking | Hiking, climbing and trekking | /travel/results_travel.html | /travel/results_travel.properties | /img/travel_icon.gif | /img/head_travel_pack_hiking.gif | |
| 5 | 0 | Toys and Games | Toys and Games | /toys/toys.html | /toys/browse_toys.properties | /img/toys_icon.gif | /img/head_toysgames.gif | TOYS |
| 6 | 0 | Clothing and Accessories | Clothing and Accessories | /apparel/apparel.html | /apparel/browse_apparel.properties | /img/apparel_icon.gif | /img/head_clothing.gif | APPAREL |
| 34 | 6 | Men's Apparel | Men's Apparel | /apparel/browse_apparel_men.html | /apparel/browse_apparel_men.properties | /img/apparel_icon.gif | /img/head_clothing_men.gif | |
| 272 | 34 | Shirts | Men's Shirts | /apparel/browse_apparel_men_shirts.html | /apparel/browse_apparel_men_shirts.properties | /img/apparel_icon.gif | /img/head_clothing_men_shirts.gif | |
| 2034 | 272 | Tops | Men's Tops | /apparel/results_apparel.html | /apparel/results_apparel.properties | /img/apparel_icon.gif | /img/head_clothing_men_shirt_tops.gif | |
| 2035 | 272 | Tees | Men's T-shirts | /apparel/results_apparel.html | /apparel/results_apparel.properties | /img/apparel_icon.gif | /img/head_clothing_men_shirt_tees.gif | |

*Fig. 5A*

| | | | | | | | |
|---|---|---|---|---|---|---|---|
| 2036 | 272 | Polo and henley shirts | Men's Polo and henley shirts | /apparel/results_apparel.html | /apparel/results_apparel.properties | /img/apparel_icon.gif | /img/head_clothing_men_shirt_polo.gif | |
| 2037 | 272 | Dress shirts | Men's Dress shirts | /apparel/results_apparel.html | /apparel/results_apparel.properties | /img/apparel_icon.gif | /img/head_clothing_men_shirt_shirt.gif | |
| 273 | 34 | Pants and shorts | Men's Pants and shorts | /apparel/browse_apparel_men_pants.html | /apparel/browse_apparel_men_pants.properties | /img/apparel_icon.gif | /img/head_clothing_men_pant_shorts.gif | |
| 2038 | 273 | Pants and khakis | Men's Pants and khakis | /apparel/results_apparel.html | /apparel/results_apparel.properties | /img/apparel_icon.gif | /img/head_clothing_men_pant_khakis.gif | |
| 2039 | 273 | Jeans and denim | Men's Jeans and denim | /apparel/results_apparel.html | /apparel/results_apparel.properties | /img/apparel_icon.gif | /img/head_clothing_men_pant_jeans.gif | |
| 2040 | 273 | Shorts | Men's Shorts | /apparel/results_apparel.html | /apparel/results_apparel.properties | /img/apparel_icon.gif | /img/head_clothing_men_pant_shorts.gif | |
| | | | | | | | | |
| 35 | 6 | Women's Apparel | Women's Apparel | /apparel/browse_apparel_women.html | /apparel/browse_apparel_women.properties | /img/apparel_icon.gif | /img/head_clothing_women.gif | |
| 279 | 35 | Shirts | Women's Shirts | /apparel/browse_apparel_women_shirts.html | /apparel/browse_apparel_women_shirts.properties | /img/apparel_icon.gif | /img/head_clothing_women_shirts.gif | |
| 2057 | 279 | Tops | Women's Tops | /apparel/results_apparel.html | /apparel/results_apparel.properties | /img/apparel_icon.gif | /img/head_clothing_women_shirt_tops.gif | |
| 2058 | 279 | Tees | Women's T-shirts | /apparel/results_apparel.html | /apparel/results_apparel.properties | /img/apparel_icon.gif | /img/head_clothing_women_shirt_tees.gif | |
| 2059 | 279 | Polo and henley shirts | Women's Polo and henley shirts | /apparel/results_apparel.html | /apparel/results_apparel.properties | /img/apparel_icon.gif | /img/head_clothing_women_shirt_polo.gif | |
| 2060 | 279 | Dress shirts and blouses | Women's Dress shirts and blouses | /apparel/results_apparel.html | /apparel/results_apparel.properties | /img/apparel_icon.gif | /img/head_clothing_women_shirt_blouse.gif | |
| | | | | | | | | |
| 36 | 6 | Shoes | Shoes | /apparel/browse_apparel_shoes.html | /apparel/browse_apparel_shoes.properties | /img/apparel_icon.gif | /img/head_clothing_shoes.gif | |
| 287 | 36 | Men's | Men's Shoes | /apparel/browse_apparel_shoe_mens.html | /apparel/browse_apparel_shoe_mens.properties | /img/apparel_icon.gif | /img/head_clothing_shoe_mens.gif | |

*Fig. 5B*

| 2085 | 287 | Shoes | Men's Shoes | /apparel/results_apparel.html | /apparel/results_apparel.properties | /img/apparel_icon.gif | /img/head_clothing_shoe_men_shoes.gif | |
| 2086 | 287 | Boots | Men's Boots | /apparel/results_apparel.html | /apparel/results_apparel.properties | /img/apparel_icon.gif | /img/head_clothing_shoe_men_boots.gif | |
| 2087 | 287 | Athletic | Men's Athletic | /apparel/results_apparel.html | /apparel/results_apparel.properties | /img/apparel_icon.gif | /img/head_clothing_shoe_men_athletic.gif | |
| 2088 | 287 | Sandals | Men's Sandals | /apparel/results_apparel.html | /apparel/results_apparel.properties | /img/apparel_icon.gif | /img/head_clothing_shoe_men_sandals.gif | |
| 2089 | 287 | Hiking and outdoor | Men's Hiking and outdoor | /apparel/results_apparel.html | /apparel/results_apparel.properties | /img/apparel_icon.gif | /img/head_clothing_shoe_men_hiking.gif | |
| 288 | 36 | Women's | Women's Shoes | /apparel/browse_apparel_shoe_women.html | /apparel/browse_apparel_shoe_women.properties | /img/apparel_icon.gif | /img/head_clothing_shoe_women_shoes.gif | |
| 2090 | 288 | Shoes | Women's Shoes | /apparel/results_apparel.html | /apparel/results_apparel.properties | /img/apparel_icon.gif | /img/head_clothing_shoe_women_shoes.gif | |

*Fig. 5C*

Priority Descriptor

| ID | Priority1 | Priority2 | Priority3 |
|----|-----------|-----------|-----------|
| 2 | category\|subcategory\|item_type | brand\|name\|store | description\|category\|subcategory\|item_type\|brand\|name\|store |
| 3 | category | brand\|name\|store\|platform\|cpu_type\|cpu_manufacturer\|cpu_speed | description\|category\|brand\|name\|store\|platform\|cpu_type\|cpu_manufacturer\|cpu_speed |
| 4 | category\|subcategory | name\|destination\|origdest1\|origdest2\|origdest3\|provider | description |
| 5 | category\|subcategory\|item_type | brand\|name\|store | description\|category\|subcategory\|item_type\|brand\|name\|store |
| 6 | category\|subcategory\|item_type | brand\|name\|store | description\|category\|subcategory\|item_type\|brand\|name\|store |

*Fig. 6*

Special Terms

| Id | DisplayName | GoodTerms | BadTerms |
|---|---|---|---|
| 2 | Electronics | | |
| 3 | Computer Hardware | | |
| 28 | Desktop computers | | |
| 29 | Laptop computers | | |
| 4 | Travel | | tv video |
| 31 | Packaged Travel | | |
| 237 | Beach and resorts | | |
| 238 | Cruises | | |
| 239 | Boating and watersports | | |
| 240 | Cycling | | |
| 241 | Hiking climbing and trekking | | |
| 5 | Toys and Games | | |
| 6 | Apparel | | |
| 34 | Men's Apparel | | |
| 272 | Men's Shirts | | |
| 2034 | Men's Tops | | |
| 2035 | Men's T-shirts | | |
| 2036 | Men's Polo and henley shirts | | |
| 2037 | Men's Dress shirts | | |
| 273 | Men's Pants and shorts | | |
| 2038 | Men's Pants and khakis | | |
| 2039 | Men's Jeans and denim | | |
| 2040 | Men's Shorts | | |
| 35 | Women's Apparel | | |
| 279 | Women's Shirts | Blouse | |
| 2057 | Women's Tops | | |
| 2058 | Women's T-shirts | | |
| 2059 | Women's Polo and henley shirts | | |
| 2060 | Women's Dress shirts and blouses | | |
| 36 | Shoes | | |
| 287 | Men's Shoes | | |
| 2085 | Men's Shoes | | |
| 2086 | Men's Boots | | |
| 2087 | Men's Athletic | | |
| 2088 | Men's Sandals | | |
| 2089 | Men's Hiking and outdoor | | |
| 288 | Women's Shoes | | |
| 2090 | Women's Shoes | | |

*Fig. 7*

Term Table — 801

| ID | Classification | Priority | Terms |
|---|---|---|---|
| 1 | 279 | 0 | Blouse |
| 2 | 272 | 1 | Men's Apparel/Men's Shirts |
| 3 | 2036 | 2 | Outback Wear/Aborigine Polo |
| 4 | 2036 | 3 | Polo shirt for active man, …. |
|  |  |  |  |
| 79 | 4 | -1 | tv video |
| 999 |  |  |  |

Index — 802

| Index | |
|---|---|
| Apparel | 2, 26, 37 |
| blouse | 1 |
| shirts | 2, 9, 15 |
| tv | 79 |

*Fig. 8*

METHOD AND SYSTEM FOR GENERATION OF HIERARCHICAL SEARCH RESULTS

TECHNICAL FIELD

The present invention relates to generating search results and, more particularly, to generating search results for hierarchically organized data.

BACKGROUND OF THE INVENTION

Many search tools are available to provide searching capability for a collection of data. For example, search tools are available to search for documents that may contain information related to a particular search criteria. Such search tools typically create an index of the words within each document. When the search criteria is received, the search tools scan the index to determine which documents contain the words of the search criteria. The search tools may also rank these documents based on various factors including the frequency of the words of the search criteria within the document or the presence of a word of the search criteria within the title of the document.

In the emerging field of electronic commerce, many thousands of products are available to be purchased electronically. For example, an online retailer may offer for sale electronic devices, major appliances, clothing, and so on. The difficulty a potential purchaser faces is identifying a particular product that satisfies the purchaser's needs. Some online retailers provide a search tool that receives a search criteria from a potential purchaser and searches a database containing information for each of the available products to identify those products that most closely match the search criteria. For example, a potential purchaser who is interested in purchasing a television may enter the search criteria of "tv." The search tool may identify every TV, but may also identify items such as video game players and VCRs that happen to use the term "tv" in their description fields in the database. Thus, many products that are of no interest to the potential purchaser are identified. Many potential purchasers, when faced with such a list that includes many products that are of no interest will simply shop elsewhere rather than wade through the list. Other online retailers may hierarchically organize the products so that a potential purchaser can browse through the hierarchy to identify the classification that contains products that are most likely of interest. For example, the potential purchaser may select an electronics device classification, a home electronics sub-classification, and a television sub-sub-classification. The hierarchical classification of products has several problems. First, many users of computer system do not fully understand the concept of hierarchical classifications. Thus, it is difficult for such users to use such a classification-based system. Second, products may not fall conveniently into any one classification. For example, a combination VCR and television could be classified as a VCR or a television. It is unlikely that an online retailer would have a separate classification for such a combination. Therefore, a potential purchaser may not even be able to locate the products of interest using a hierarchical classification system.

It would be desirable to have a product search technique that would combined the advantages of the search systems and the classification-based systems and that minimizes their disadvantages.

SUMMARY OF THE INVENTION

Embodiments of the present invention provide a method and system for querying hierarchically classified data. The system of the present invention first receives a query request. The system then identifies classifications of the data that may satisfy the received query request. The system then displays the identified classifications. In response to selection of a displayed classification, the system displays sub-classifications when the selected classification has sub-classifications and displays the data within the classification when the selected classification has no sub-classifications.

In another aspect, the present invention provides a system that generates search results for items that are hierarchically classified. For classifications within the hierarchy of classifications, the system generates a search entry containing terms describing the items within that classification. The system then receives a search criteria. The system selects as initial search results those classifications whose search entry has terms that most closely match the received search criteria. The system then adjusts the initial search results based on the hierarchy of classifications. This adjustment may include removing sub-classifications of a classification that is in the initial search results or adding a parent classification to replace multiple child classifications in the initial search results.

BRIEF DESCRIPTION OF THE DRAWINGS

FIGS. 3A and 3B illustrate example contents of a travel table and of an apparel table.

FIGS. 5A, 5B, and 5C illustrate an example organization of the browse tree descriptor file.

FIG. 6 illustrates the contents of a sample priority descriptor file. The priority descriptor file contains an entry for each department represented in the product database.

FIG. 7 illustrates example contents of the special terms file.

FIG. 8 illustrates the contents of the GPS index.

DETAILED DESCRIPTION OF THE INVENTION

Figure 1A:
FIGS. 1A and 1B illustrate an example user interface for one embodiment of the present invention.

Embodiments of the present invention provide a method and system for general purpose searching ("GPS"). The GPS system allows a user to search for items that best match a search criteria. To facilitate the searching, the GPS system groups the items into a classification hierarchy. For example, if the items are articles of clothing, then classifications may be "shirts," "pants," and "shoes," and sub-classification of "shirts" may be "T-shirts," "casual shirts," and "dress shirts." The GPS system inputs a search criteria from a user, searches for the classifications of items that best match the search criteria, and displays those classifications in an order based on how well they match the search criteria. In one embodiment, the GPS system displays only the best matching classifications of items, rather than displaying information about any individual items. The user can then select a displayed classification to view the sub-classifications within that classification or, if that classification has no sub-classification, the items within that classification.

When the GPS system inputs a search criteria, it scores each classification in the classification hierarchy to indicate the degree to which the classification contains items that match the search criteria. For example, the GPS system would generate a score for each of the "shirts," "pants," and "shoes" classifications and for each of the "T-shirts," "casual shirts," and "dress shirts" sub-classifications. The GPS system then selects those classifications or sub-classifications with the highest scores and displays them in order based on their score. Because users often find it difficult to interface with hierarchically presented information, the GPS system in one embodiment displays the names of the selected classifications with no indication of where the classifications are within the hierarchy. For example, if the classifications of "dress shirts" and "shoes" have the highest scores, then the GPS system may simply list the classification names as follows:

dress shirts shoes

If the user then selects "shoes," the GPS system displays the sub-classifications of "shoes." If the user, however, selects "dress shirts," then the GPS system may display a description of each dress shirt.

Since the GPS system scores each classification within the hierarchy, various parent and child classifications and more generally various ancestor and descendent classifications may have high scores. For example, both the "shirts" classification and the "dress shirts" sub-classification may have high scores. In one embodiment, the GPS system does not display any descendent classifications of a displayed classification. For example, if the GPS system selects to display the classification "shirts," then it does not display its sub-classification of "dress shirts," regardless of the score of the sub-classification. The user can always select the displayed ancestor classification to view the descendent classifications. In some situations, a parent classification may have a relatively low score, but many of its child classifications may have a high score. In such a situation, the GPS system may display the parent classification rather than displaying each child classification. For example, if the "shirts" classification has a relatively low score, but the "T-shirts" and "dress shirts" sub-classifications have high scores, the GPS system may decide to display only the "shirts" classification. The GPS system may set the score of the "shirts" classification to that of its highest sub-classification so that the displayed classification will be ordered based on the score of its sub-classifications.

Figure 1B:
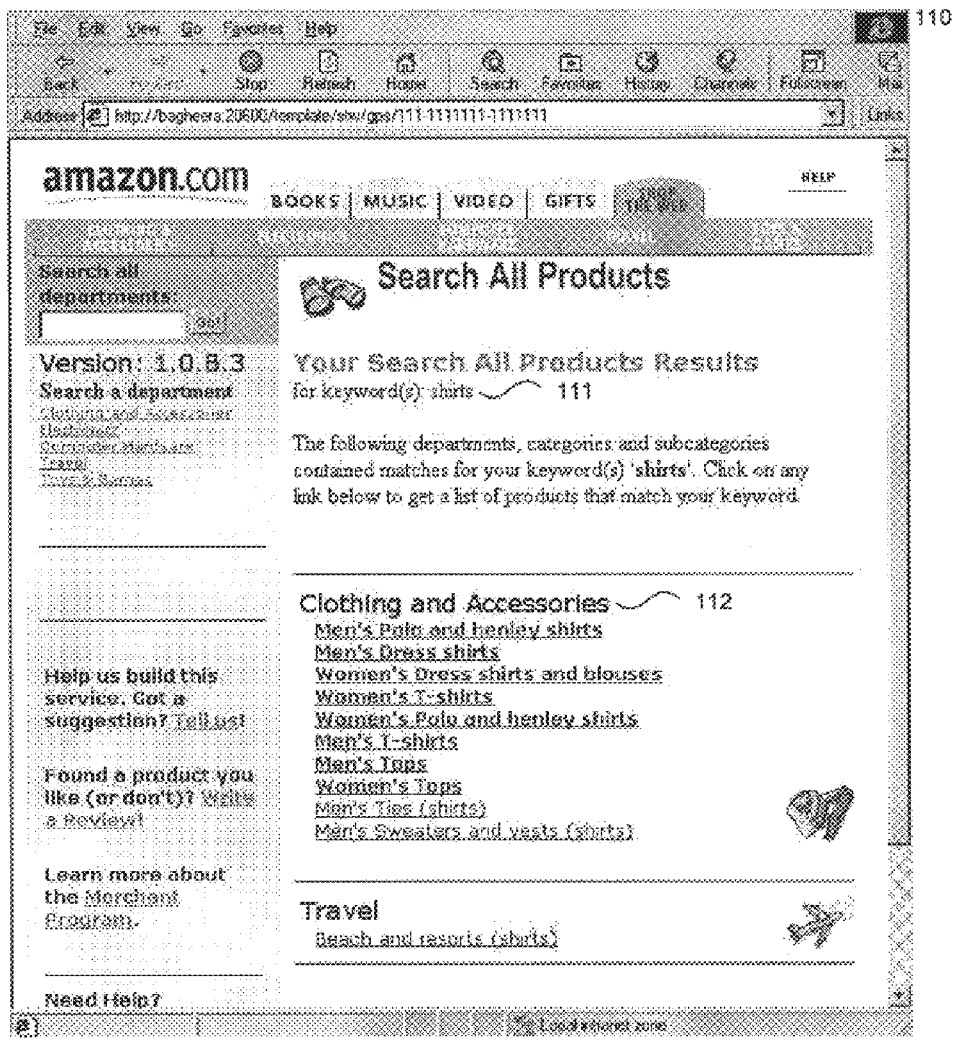

FIGS. 1A and 1B illustrate an example user interface for one embodiment of the present invention. In this embodiment, the GPS system provides capabilities for searching for items that may be purchased. The techniques of the present invention are particularly well suited for use in a Web-based shopping environment. The display 100 of FIG. 1A illustrates a Web page for searching for items that may be purchased via an online store. This Web page illustrates that the available item are grouped into five departments: clothing and accessories 101, electronics 102, computer hardware 103, toys and games 104, and travel 105. The item in each of these departments are classified into categories, sub-categories, and possibly a sub-sub-category referred to as item type. For example, the clothing and accessories department has four item categories: men's apparel, women's apparel, shoes, and accessories. The user enters the search criteria or query into search query box 106. In this example, the user has entered the word "shirts" as the search criteria. Display 110 of FIG. 1B illustrates the display of the search results. Rather than displaying the particular items that best match the search criteria, the GPS system displays the classifications of items that best match the search criteria. The GPS system orders the classifications based on the likelihood that they contain items of interest. In this example, the GPS system determines that the clothing and accessories department contains items that best match the search criteria. As a result, the GPS system displays an indication of the clothing and accessories department first. The GPS system also displays the various categories and sub-categories of the clothing and accessories department that best match the search criteria. The GPS system displays these categories and sub-categories in order based on the likelihood that the categories contain items that satisfies the search criteria. In this example, the GPS system has listed 10 classifications of the clothing and accessories department. The GPS system highlights the first eight classifications because the word "shirts" was found in the sub-category name. For example, the category "Polo and henley shirts" contain the word "shirts" in its name. However, the last two classifications do not contain the word "shirts" in their sub-category names. Rather, the word "shirts" may have been contained in a description field for an item within those classifications. For example, the sub-category "Men's Ties" may have had an item that contained the word "shirts" in its description field. The placing of the word "shirts" in parenthesis indicates that the word was not found in the name of the sub-category. In general, the GPS system highlights (e.g., bolds) the names of those classifications in which every item should satisfy the search criteria. For example, the first eight displayed classifications of the clothing and accessories department are highlighted. The GPS system determined that the department "travel" is the second most relevant department for the search criteria. The GPS system displays the information for the travel department after the information for the clothing and accessories department because the score for the classifications within the travel department were lower than the score for the classifications in the clothing and accessories department.

Once the GPS system displays the search results, as shown in FIG. 1B, a user may select one of the classifications to view detailed information about the classification. For example, if the user is interested in purchasing a T-shirt for a man, then the user may select the category "Men's T-shirts." Upon selecting this classification, the GPS system displays information describing the items within that classification. If the selected classification has sub-classifications, then the GPS system instead displays the sub-classifications.

Figure 2:
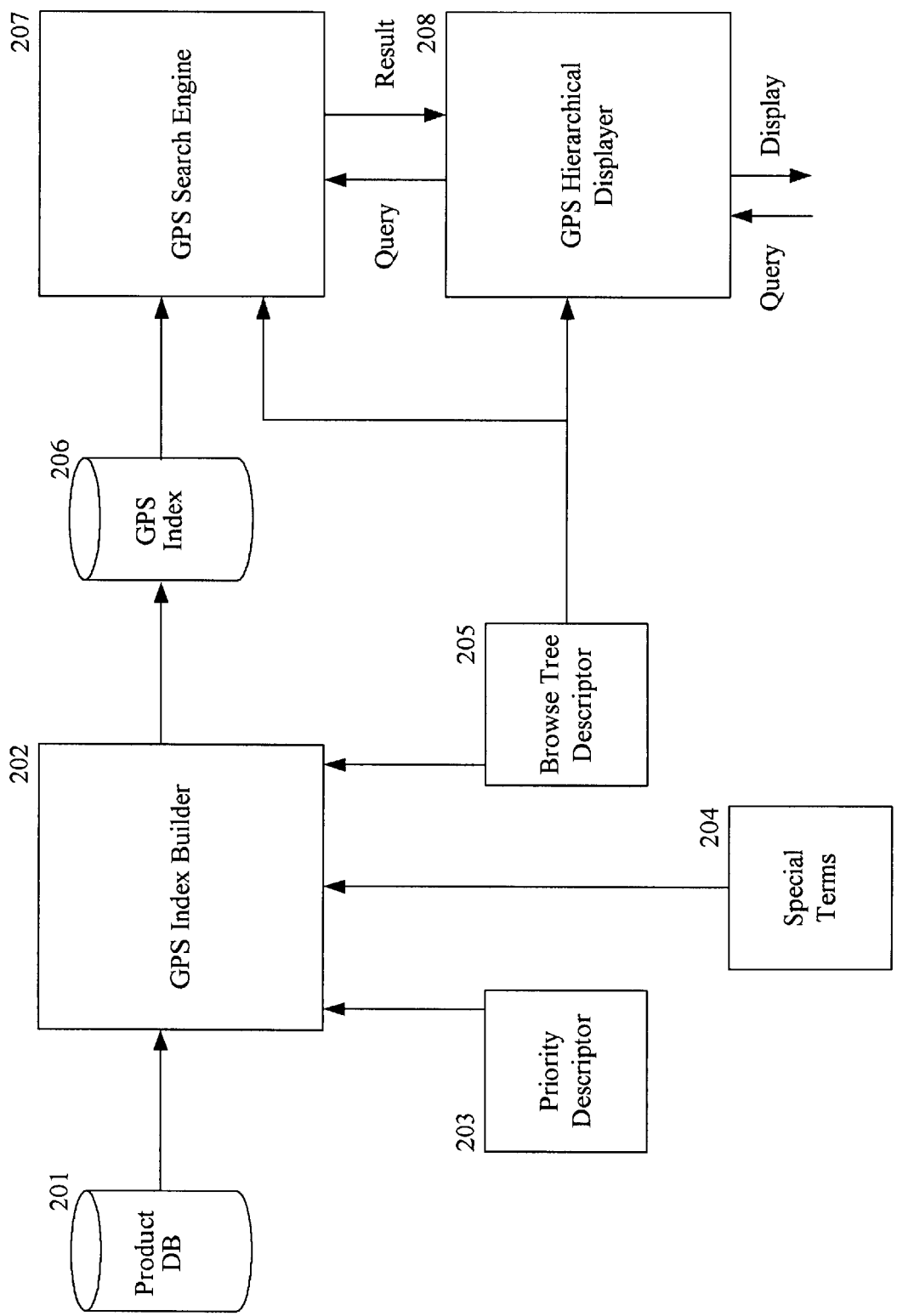
FIG. 2 is a block diagram illustrating components of one embodiment of the GPS system.

FIG. 2 is a block diagram illustrating components of one embodiment of the GPS system. The GPS search system comprises a product (or item) database 201, a GPS index builder 202, a priority descriptor file 203, the special terms file 204, a browse tree descriptor file 205, a GPS index file 206, a GPS search engine 207, and a GPS hierarchical displayer 208. These components can be implemented as part of a general purpose computer system. The GPS system may be implemented as a server in a client/server environment such as the World Wide Web or may be implemented on a computer, such as a mainframe.

The GPS index builder creates the GPS index, which contains an entry for each classification, based on the names of the classifications and the content of the fields in the product database. The product database contains an entry for each item. The entries of the GPS index contain a collection of the words that appear in the entries of the product database for the items within that classification or the words in the names of the classification. After the GPS index is created, the GPS search engine receives a query and returns those entries whose collection of words most closely match the query. In one embodiment, the GPS index may contain multiple entries for some classifications that indicate different priorities assigned (or weights) based on the fields of the product database in which the terms appear. For example, each classification may contain one entry that contains the words from the name of the classification and from the name of its parent classification. The leaf (i.e., lowest-level) classifications, however, may also contain additional entries in the GPS index. One additional entry may contain all the words from all the description fields of all the items within the classification. Such entries are said to have a lower priority than entries that contain only the words in the name of the classifications because words in the name of a classification are assumed to be more descriptive of the entire classification than a word in a description field of some item within that classification. Each entry also contains an indication of its priority.

The GPS search engine may use a conventional database search engine to locate the entries of the GPS index that contain words that best match the search criteria. The conventional search engines return as the results of the search the entries that best match along with a score that indicates how well each matches. The GPS search engine then adjusts the scores of the entries in the result to factor in their priorities. For example, the GPS system may not adjust the score of an entry that has a high priority, but may reduce the score of an entry that has low priority. Once the scores are adjusted, the GPS search engine may remove all but the entry with the highest score for each classification from the result. The GPS search engine then removes all entries for sub-classifications when an entry for an ancestor classification in the result. That is, the GPS search engine ensures that if an entry for the root of a classification sub-tree is in the result, then the result contains no entry for any descendent classifications. The GPS search engine sets the score of the root classification of a sub-tree to the highest score of the entries for that sub-tree. The result may also contain an entry for each child classification but not an entry for the parent classification. In such a situation, the GPS search engine may remove each of the entries for the child classifications and adds a new entry for the parent classification. The GPS search engine may set the score of the new entry to the highest score of the child classifications.

The GPS hierarchical displayer receives the results of the GPS search engine and first determines which highest level classification (e.g., department) has the highest score. The GPS hierarchical displayer selects those classifications with that highest level classification with the highest score and displays the name of the highest-level classification along with the names of the selected classification. The GPS hierarchical displayer can select a predefined number of such classifications or select a variable number depending on the differences in the scores of the classifications. The GPS hierarchical displayer then repeats this process for the highest level classification with the next highest score and so on.

In one embodiment, the product database contains a department table for each department in the online store. The department may be considered to be the highest classification. Each department table contains one entry for each item that is available to be purchased through the department. FIGS. 3A and 3B illustrate example contents of a travel table and of an apparel table. The tables include field that specify the classification of each item within the classification hierarchy. For example, the travel table 301 contains a category and a sub-category field. The first entry in the travel table indicates that the item is in category 31 and sub-category 237. The entries also contain various other fields to describe the item. For example, the travel table contains a name field, a destination field, a provider field, and a description field. Each table also contains an ID field, which contains a value that uniquely identifies each entry within that table. The apparel table of FIG. 3B contains the items for the clothing and accessories department.

Figure 4:
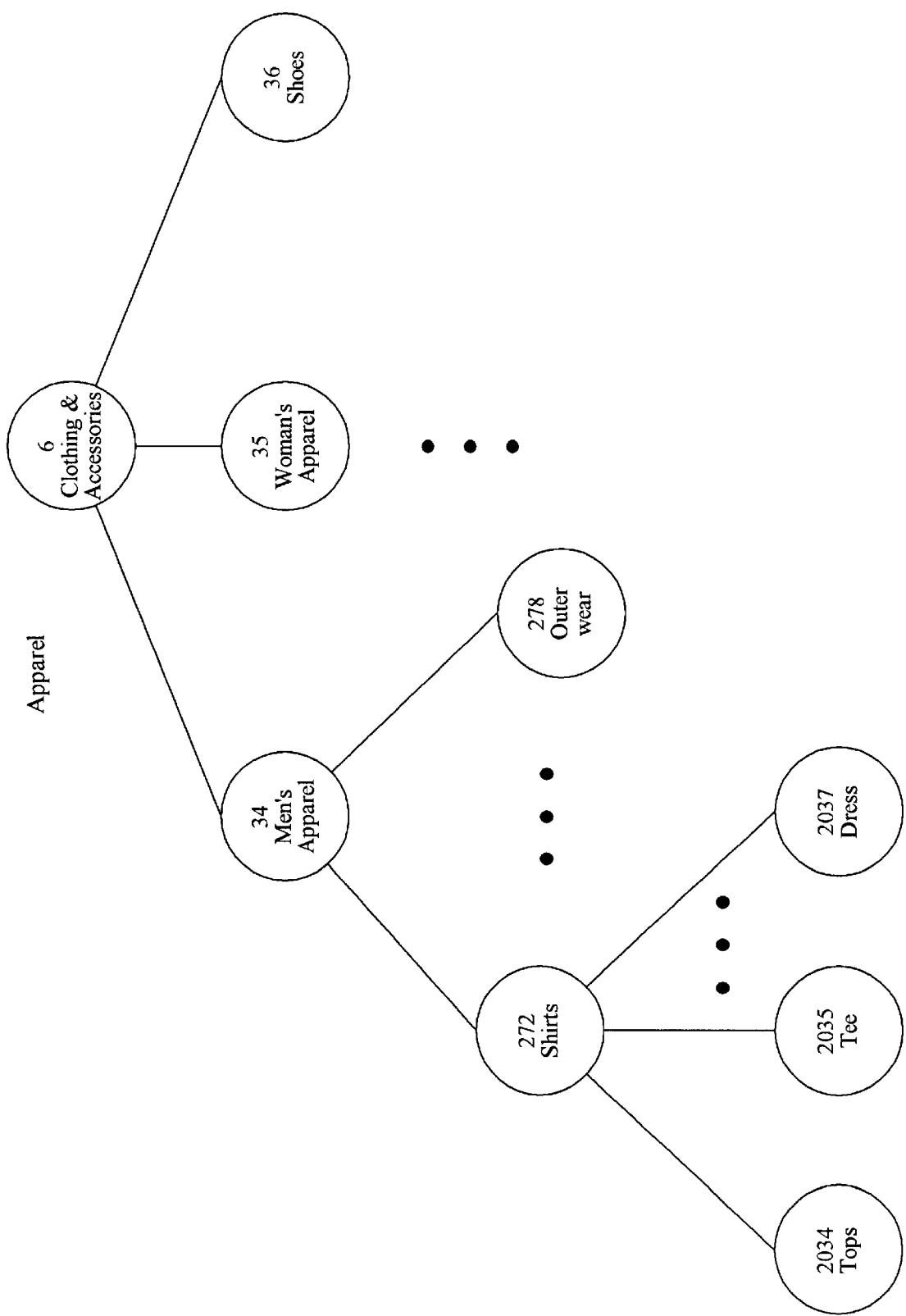
FIG. 4 illustrates a hierarchical organization of the items in the apparel table of the product database.

The GPS index builder inputs the product database, the priority descriptor file, the special terms file, and the browse tree descriptor file and generates the GPS index file. The browse tree descriptor file contains a definition of the hierarchical organization of the items in the product database. Although the product tables inherently contain the classification hierarchy (e.g., classification 237 is a sub-category of classification 31), it is not in a form that is easy to use. Moreover, the product database in this embodiment contains no information that describes the names of the various classifications. FIG. 4 illustrates a hierarchical organization of the items in the apparel table of the product database. As shown, the items in the apparel table are classified into three levels: category, sub-category, and item type. The categories of the apparel table include "men's apparel" (34), "women's apparel" (35), and "shoes" (36). The sub-categories of men's apparel include "shirts" (272) and "outerwear" (278). The item types for the items within the "shirts" sub-category include "tops" (2034), "T-shirts" (2035), and "dress shirts" (2037). FIGS. 5A, 5B, and 5C illustrate an example organization of the browse tree descriptor file. The ID field contains the classification identifier, which correlates to the classification identifiers used in the product database. For example, the entry with a classification identifier of 237 defines that classification. The parent field indicates the parent classification. For example, classification 31 is the parent classification of classification 237. The name field contains the name of the classification. For example, the name of classification 237 is "Beach and resorts." The ID field and the parent field define the classification hierarchy, and the ID field, the parent field, and the name field are used when building the GPS index. The other fields are used by the GPS hierarchical displayer when displaying the results of a search. The display name field contains the name that is to be displayed when that classification is displayed. For example, the display name for classification 237 is "Beach and resorts." The URL alias field identifies the resource (e.g., HTML file) that is displayed when the classification is selected when browsing through the search result. The config file field identifies a file that contains information for use in generating the resource for a classification. The image field identifies an icon that is to be displayed when the classification is displayed. The title image field identifies an image that is to be displayed as the title when a classification is selected. The table name stem file contains the name of the table in the product database that contains the entries for the items within this classification.

The priority descriptor file indicates how to score the presence of the search criteria in the various fields of the tables. For example, the presence of a search term in a category, a sub-category, or an item type name is given more weight than the presence of the search term in a description of the item. FIG. 6 illustrates the contents of a sample priority descriptor file. The priority descriptor file contains an entry for each department represented in the product database. For example, the department identified by a classification identifier of 6 is the clothing and accessories department as indicated by the corresponding entry in the browse tree description file. The priority 1 field indicates that the presence of the search term in the category name, sub-category name, or item type name (e.g., "category|subcategory|item_type") should be given highest score. The priority 2 field indicates that the presence of the search term in the brand field, name field, or store field (e.g., "brand|name|store") should be given a lower score. The priority 3 field indicates that the presence of the search term in the description field or any of the other fields listed should be given lowest score. In one embodiment, the GPS index builder initially adds only one entry at priority 1 for non-leaf classifications into the GPS index. The GPS index builder then adds two entries at priorities 2 and 3 for leaf classifications into the GPS index as discussed below.

FIG. 7 illustrates example contents of the special terms file. The special terms file lists various words (i.e., "Good Terms") that are synonymous with the classification names. For example, the term "blouse" is synonymous with the classification name "women's shirts." The file also lists various words (ie., "Bad Terms") that should be disregarded from the description field of the items within that classification. For example, the term "tv" should be disregarded when it occurs in the description field of a travel item. A description of a cruise may indicate that a "tv" is in each cabin. However, when a user enters the search term "tv," the user is likely interested in electronic-related items rather than travel-related items. The special terms file may also be integrated into the browse three descriptor file. The GPS index builder creates GPS index entry at priority 0 for each entry in the special terms file that contains a good term. The GPS index builder also creates an entry at priority -1 for each entry in the special terms file that contains a bad term so that the GPS search engine will know to disregard classifications in which a priority -1 entry is initially reported as satisfying the search criteria.

FIG. 8 illustrates the contents of the GPS index. The GPS index contains term table 801 and index 802. The term table contains various entries for each classification within the classification hierarchy. Each entry contains an entry identifier (e.g., "1"), a classification identifier (e.g., "279"), a priority (e.g., "0"), and a terms field (e.g., "blouse"). The terms field contains terms that the GPS index builder retrieves based on the priority descriptor file. For example, since classification 272 is in department 6, clothing and accessories, its terms field for its priority 1 entry contains all the terms from the fields specified in the priority descriptor file, that is, from the category, sub-category, and item type names. The index contains an entry for each word that is found in a terms field of the term table. Each entry contains a pointer to the entries of the term table that contain that term. For example, the entry for the word "shirts" in the index indicates that the word "shirt" is found in rows 2, 4, and 15. The term table and index can be created using capabilities provided by conventional databases, such as those provided by Oracle Corporation.

In one embodiment, the GPS system logs search requests along with the search results and may also log which search results (i.e., classifications) are selected by the user. Periodically, these logs can be analyzed to determine whether synonyms should be added for a search term. For example, users may enter the search term "aparel," rather than "apparel." Because the term "aparel" is not in the product database and not in the classification hierarchy, the search result will be empty. Therefore, it would be useful to add the term "aparel" as a synonym of "apparel." The GPS system provides a log analyzer to help determine when to add synonyms. In one embodiment, the log analyzer identifies the search requests that resulted in no search results or in very few classifications in the search results and displays the identified search requests to an analyst responsible for deciding on synonyms. For example, the terms of the identified search requests can be displayed along with a field so that the analyst can enter the word(s) with which the displayed search term is synonymous. The log analyzer may also display statistical information as to how many times the displayed search term was entered by a user. Also, the log analyzer may display additional information such as a subsequent search request entered by the same user that does return search results. The log analyzer may also display search requests for which the user selected none of the search results. In such a situation, the analyst may also want to add the search terms as synonyms. For example, if users enter the search request "sole" and the search results relate only to shoes, the analyst may want to indicate that "sole" is a synonym for "soul," as in music.

Figure 9:
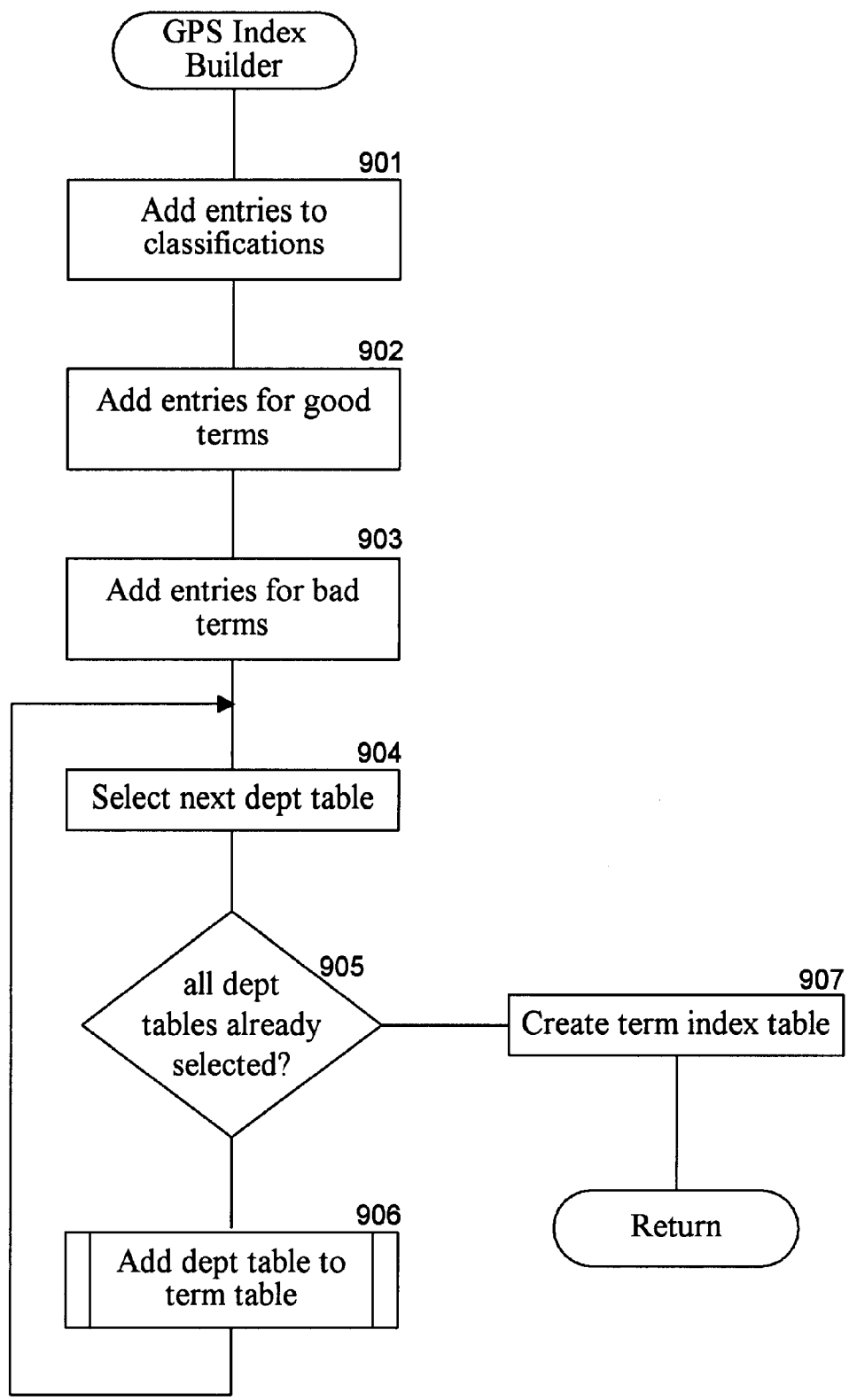
FIG. 9 is a flow diagram illustrating an example embodiment of the GPS index builder.

FIG. 9 is a flow diagram illustrating an example embodiment of the GPS index builder. The GPS index builder creates the GPS index by adding priority 1 entries for each classification and adding priority 0 and -1 entries as indicated by the special terms file. The GPS index builder then selects each department table in the product database and adds the terms associated with each entry into the priority 2 and 3 entries of the term table for leaf classifications. In step 901, the GPS index builder adds priority 1 entries to the term table for each classification. The GPS index builder processes each entry in the browse tree descriptor file and adds a corresponding priority 1 entry to the term table that contains terms in accordance with the priority descriptor file. In steps 902 and 903, the GPS index builder adds priority 0 and priority -1 entries to the term table as indicated by the special terms file. In steps 904–906, the GPS index builder loops adding the priority 2 and priority 3 terms to the term table by processing each department table of the product database. In step 904, the GPS index builder selects the next department table starting with the first. In step 905, if all the department tables have already been selected, then the GPS index builder continues that step 907, else the GPS index builder continues that step 906. In step 906, the GPS index builder invokes a routine to add the terms of the selected department table to the term table and then loops to step 904 to select the next department table. In step 907, after the term table has been filled, the GPS index builder creates the index for the term table.

Figure 10:
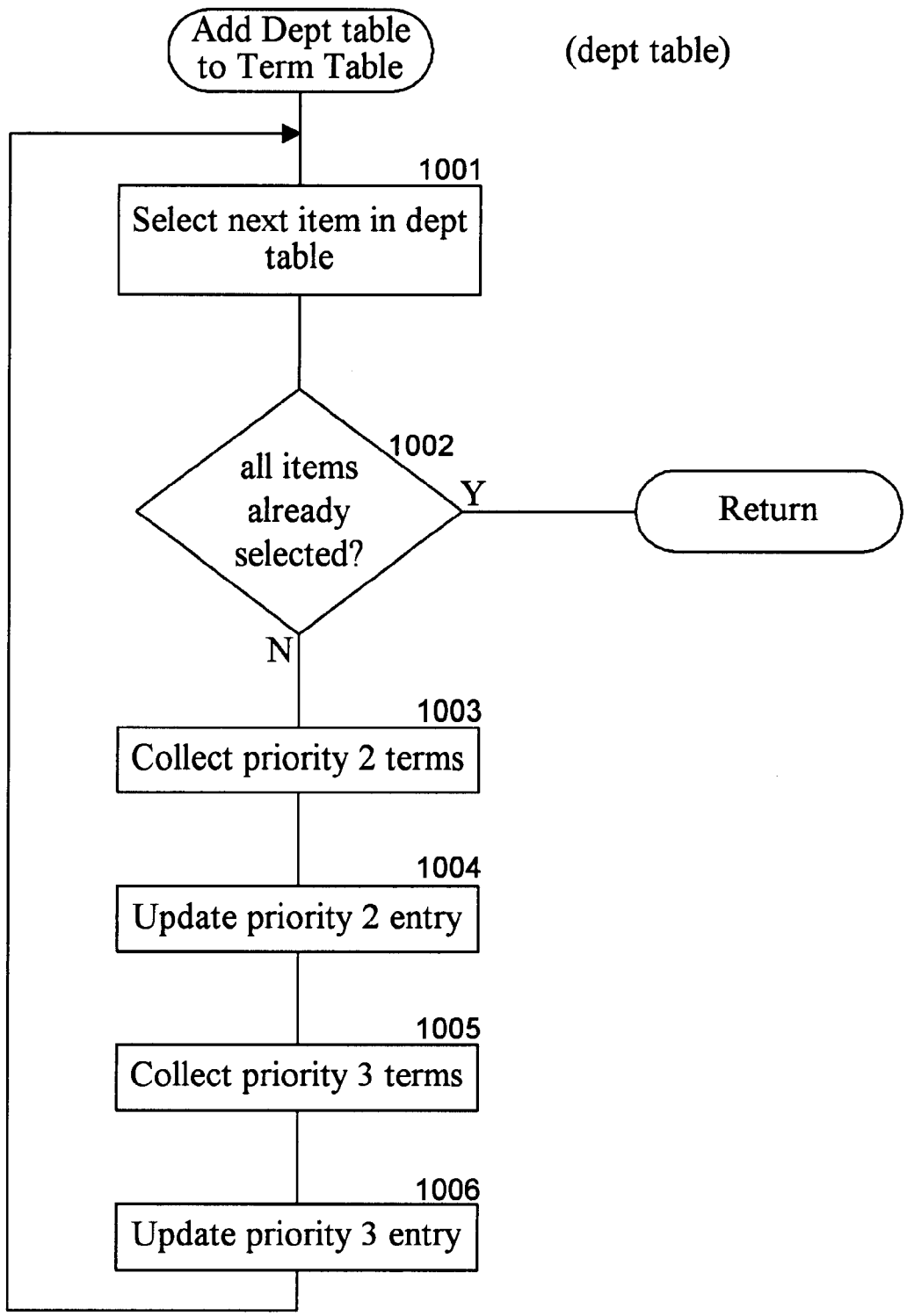
FIG. 10 is a flow diagram of an example routine to add a department table to the term table.

FIG. 10 is a flow diagram of an example routine to add a department table to the term table. This routine is passed an indication of the department table and adds the terms of that department table to the term table of the GPS index for the leaf classifications. In steps 1001–1006, the routine loops selecting each item in the department table. In step 1001, the routine selects the next item in the department table starting the first. In step 1002, if all the items have already been selected, then the routine returns, else the routine continues at step 1003. In step 1003, the routine collects all priority 2 terms from the selected item in accordance with the priority descriptor file. In step 1004, the routine updates the priority 2 entry in the term table for the leaf classification of the entry by adding the collected terms to the terms field of the entry.

The routine creates the entries of the term table as appropriate. In step 1005, the routine collects all the priority 3 terms from the selected item. In step 1006, the routine updates the priority 3 entry in the term table in accordance with the priority descriptor file and loops to step 1001 to select the next item in the table.

Figure 11:
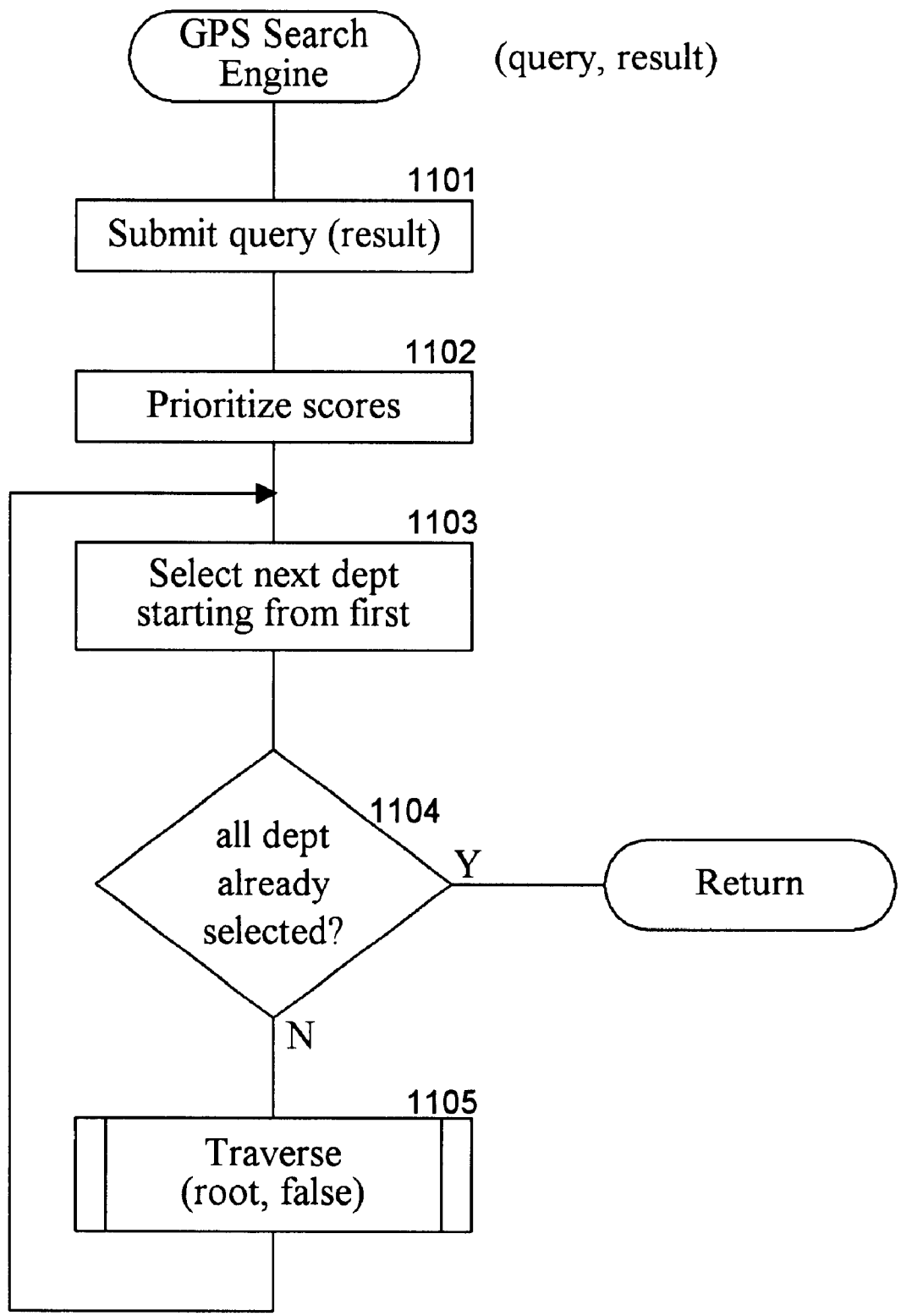
FIG. 11 is a flow diagram of an example implementation of the GPS search engine.

FIG. 11 is a flow diagram of an example implementation of the GPS search engine. The GPS search engine is passed a query and returns the results for that query. In step 1101, the GPS search engine submits the query to a conventional database and receives the results. The results contain the identifier of entries in the term table along with a score for each entry. The score provides an indication of how closely the terms of the entry matches the search criteria. As discussed above, conventional databases provide such query capabilities. The query capabilities may support sophisticated analyses to determine the scores. The analyses may include using word stem analysis, word count analysis, and synonym analysis. In step 1102, the GPS search engine prioritizes the scores of the results that are returned. When prioritizing the scores, the GPS search engine removes all the entries of the search result for a classification and its sub-classifications when the classification has a priority -1 entry. For example, if the result has a priority -1 entry for the classification of travel (e.g., because the search term included "tv"), then the GPS search engine removes all entries of the search result for the travel classification along with entries for any of its sub-classifications. The GPS search engine may then remove duplicate entries for a classification (e.g. priority 2 or priority 3 entry) leaving the entry with the higher score. The GPS search engine then normalizes the score for each entry in the result to reflect the priority of the entry. The conventional database scores the entries independently of the priorities. Thus, normalizing factors the priority into the score. In one embodiment, the GPS search engine does not modify the scores for the priority 0 or 1 entries. The GPS search engine does, however, divide the scores of priority 2 entries by 4 and the scores of priority 3 entries by 9 to effect the normalization. One skilled in the art would appreciate that the normalization process may be tailored based on analysis of the scoring of the conventional database that is used and analysis of the priority descriptor file. One skilled in the art would also appreciate that a different number of levels of priorities may be used. In steps 1103–1105, the GPS search engine loops processing each department. In step 1103, the GPS search engine selects the next department starting the first. In step 1104, if all the departments have already been selected, then the GPS search engine returns, else the GPS search engine continues at step 1105. In step 1105, the GPS search engine invokes the routine traverse to traverse the classification hierarchy for that department.

Figure 12:
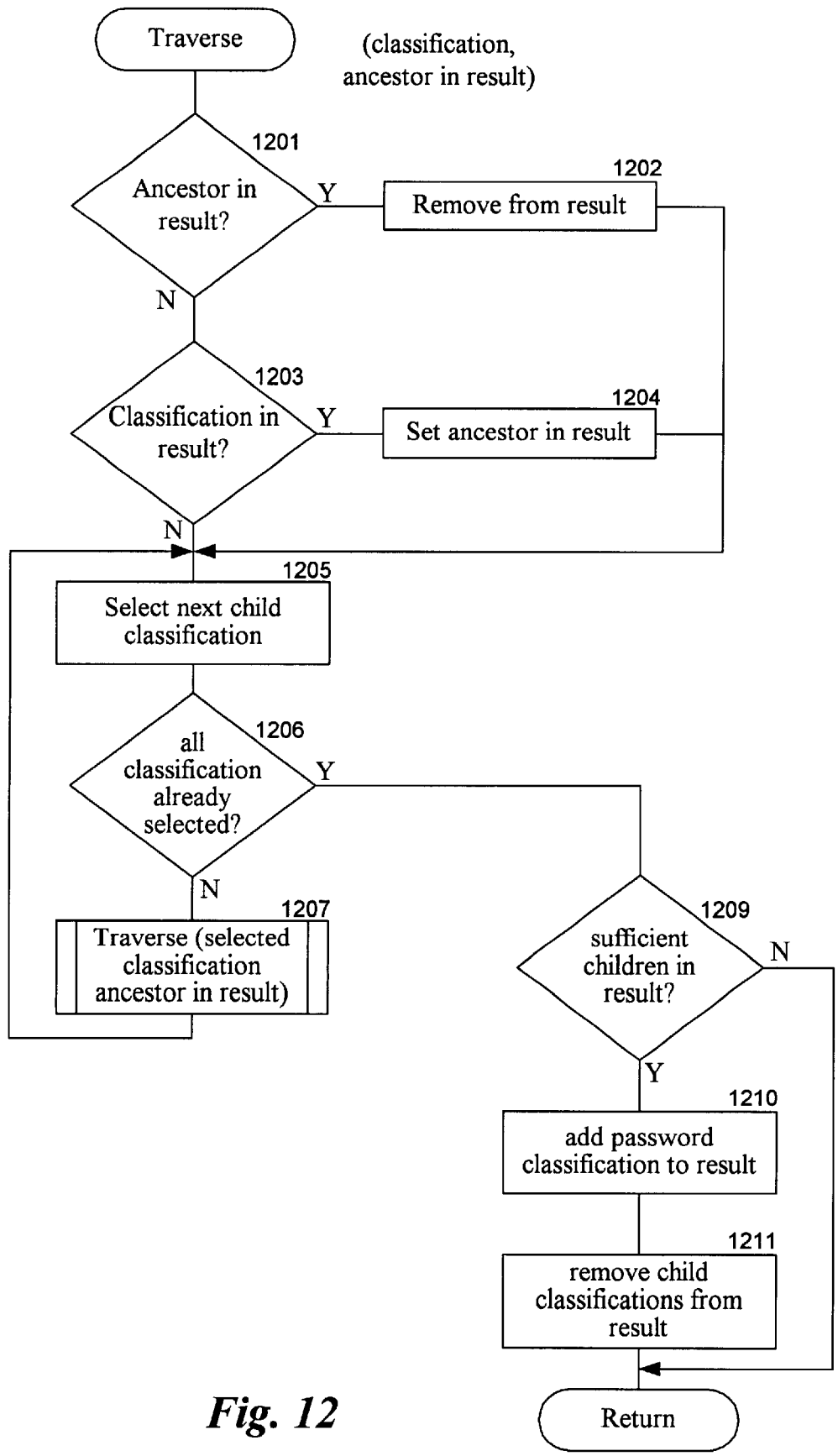
FIG. 12 is a flow diagram of an example implementation of the traverse routine.

FIG. 12 is a flow diagram of an example implementation of the traverse routine. The routine is passed an indication of a classification and an indication as to whether an entry for an ancestor classification is in the results. If an entry for a classification is in the results, then entries for any sub-classification of that classification are removed. This routine recursively invokes itself for each child classification. The traverse routine is a recursive routine that traverses the classifications of hierarchy in a depth-first manner. In step 1201, if an entry for an ancestor classification is in the results, then the routine continues at step 1202, else the routine continues at step 1203. In step 1202, the routine removes the entry for the passed classification from the results. In step 1203, if an entry for the passed classification is in the results, then the routine continues at step 1204, else the routine continues at step 1205. In step 1204, the routine sets the ancestor in the result flag to indicate that when traversing the sub-classification their entries are to be removed. In steps 1205–1207, the routine loops selecting each child classification and recursively invoking the traverse routine. In step 1205, the routine selects the next child classification starting with the first (using the browse tree descriptor file). In step 1206, if all the child classifications of the passed classification have already been selected, then the routine continues at step 1209, else routine continues at step 1207. In step 1207, the routine recursively invokes the traverse routine passing the selected child classification and the ancestor in result flag. The routine then loops to step 1205 to select the next child classification. In step 1209, if there are entries for sufficient child classifications in the results to add the passed classification, then the routine continues at step 1210, else the routine returns. In some embodiments, it may be preferable to add an entry for a parent classification when all or most of the child classifications have an entry in the results. In this way, the parent classification can be displayed rather than displaying each child classification. The threshold for when to add an entry for a parent classification can be tailored to specific embodiments. For example, the threshold can be a percentage (e.g., 50%) of the child classifications that have entries in the results. The threshold may also factor in the scores of the entries of the child classifications. For example, if entries for all child classifications are in the results, but only one entry has a high score and the other entries have low scores, then it may be preferable to leave the entries for the child classifications in the result. If, however, an entry for the parent classification is added, then it should be assigned a score based on the scores of its child classifications. In one embodiment, the assigned score is the highest score of the child classifications. Alternatively, the assigned score could be an average or weighted average of the score for the child classifications. For example, if each child score is approximately the same, then the assigned score could be higher than any scores of the child classifications, because the parent classification contains many sub-classifications of a certain score. In step 1210, the routine adds the passed classification to the results and gives it the highest score of its child classifications. In step 1211, the routine removes the child classifications of the passed classification from the results and returns.

Figure 13:
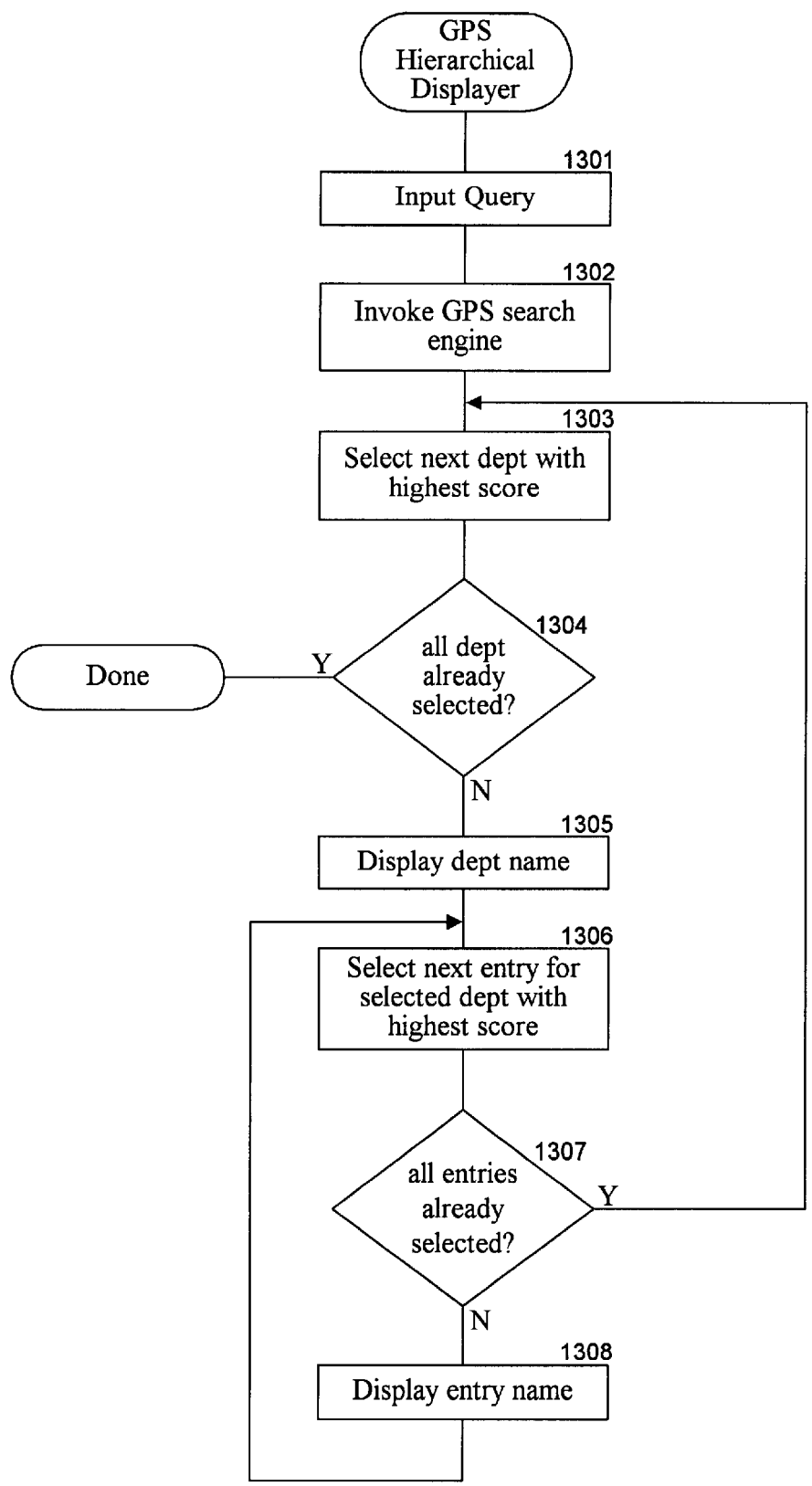
FIG. 13 into flow diagram of an example implementation of a GPS hierarchical displayer routine.

FIG. 13 into flow diagram of an example implementation of a GPS hierarchical displayer routine. This routine uses the browse tree descriptor file to hierarchically organize the search results and to identify the configurations in which to display the results for various classifications. Although not displayed in this flowchart, the GPS hierarchical displayer also receives selections of displayed classifications and uses the browse tree descriptor file to display sub-classifications if the selected classification is a non-leaf classification. If the classification is a leaf classification, the GPS hierarchical displayer displays information retrieved from the product database relating to the items in that leaf classification. In step 1301 the routine inputs a query from a user. In step 1302, the routine invokes the GPS search engine passing the query and receiving in return the search results. In steps 1303–1308, the routine loops displaying the search results. In step 1303, the routine selects the next department with an entry for one of its sub-classifications the next highest score that is in the results. In step 1304, if all the departments have already been selected, then the routine is done, else the routine continues at step 1305. In step 1305, the routine displays the department name. One skilled in the art would appreciate that this "displaying" may be the creating of an HTML file that is sent to a client computer to be displayed. In step 1306, the routine selects the entry for the selected department with the next highest score starting with the entry with the highest score. The routine may limit the number of classifications displayed for a department. For example, the routine may display only those classifications whose scores are above the average for that department. Alternatively, the routine may display only those classifications whose scores are within a certain deviation from the highest score for that department. In step 1307, if all the entries for the selected department have already been selected, then the routine loops to step 1303 to select the next department, else the routine continues at step 1308. In step 1308, routine displays the name of the selected entry and loops to step 1306 to select the entry with the next highest score.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer system for generating search results for items that are hierarchically classified, the method comprising:
   providing a hierarchy of classifications;
   for classifications within the provided hierarchy of classifications, generating a search entry containing terms describing the items within that classification; and
   after the hierarchy of classifications is provided,
      receiving a search criteria;
      selecting as initial search results those classifications whose search entry has terms that most closely match the received search criteria; and
      adjusting the initial search results based on the provided hierarchy of classifications.

2. The method of claim 1 wherein the adjusting includes for an entry in the initial search results, removing all entries that represent descendent classifications of that entry.

3. The method of claim 2 wherein a score is associated with each entry in the initial search results and the adjusting includes adjusting the score of an entry when an entry for a descendent classification is removed.

4. The method of claim 3 wherein the adjusting of the score sets the score to the highest score of a descendent classification.

5. The method of claim 1 wherein when a classification has no entry in the initial search results and has entries for child classifications that surpass a threshold, removing the entries for the child classifications and adding an entry for the classification.

6. The method of claim 5 wherein a score is associated with each entry in the initial search results and wherein the added entry is given a score based on the scores of the entries for the child classifications.

7. The method of claim 6 wherein the given score is the highest score of the entries of the child classifications.

8. The method of claim 1 wherein the generating includes assigning a priority to each search entry based on the source of the terms.

9. The method of claim 8 wherein the source of the terms includes the name of the classifications.

10. The method of claim 8 wherein the source of terms for leaf classifications includes a description of each item in the leaf classification.

11. The method of claim 1 wherein the adjusting of the initial search results include removing the entry for a classification that is selected based on negative terms for that classification.

12. The method of claim 1 wherein the generating includes retrieving item entries for the items within the classification and adding to the search entry the terms from the retrieved item entries.

13. The method of claim 1 wherein the generating includes for each classification, retrieving an indication of from where the terms are to be retrieved.

14. The method of claim 13 wherein in some of the terms are retrieved from the names of the classifications.

15. The method of claim 13 wherein some of the terms are retrieved from descriptions of the items within the classification.

16. The method of claim 1 including displaying an indication of the classifications of the entries in the adjusted search results.

17. The method of claim 16 including receiving a selection of a displayed classification and displaying sub-classifications of the selected classification.

18. The method of claim 16 including receiving a selection of a displayed classification and displaying information describing items within the selected classification.

19. A method in a computer system for querying hierarchically classified data, the method comprising:
   providing a hierarchy of classifications; and
   after providing the hierarchy of classifications,
      receiving a query request;
      identifying classifications of the data that may satisfy the received query request;
      displaying the identified classifications; and
      in response to selection of a displayed classification,
         when the selected classification has sub-classifications, displaying sub-classifications; and
         when the selected classification has no sub-classifications, displaying the data within the classification.

20. The method of claim 19 wherein the identified classifications include no sub-classifications of an identified classification.

21. The method of claim 19 wherein when sufficient sub-classifications of a classification may satisfy the received query request, identifying the classification rather than the sub-classifications.

22. The method of claim 21 wherein classifications have scores based on how well they may satisfy the received query request and wherein the classification that is identified rather than the sub-classifications is assigned a score based on the scored of its sub-classifications.

23. The method of claim 19 wherein the data represents items in an electronic catalog.

24. The method of claim 19 wherein the data represents items that may be purchased.

25. The method of claim 19 including:
   for classifications within the hierarchy of classifications, generating a search entry containing terms describing the data within that classification; and
   wherein the identifying includes:
      selecting as initial query results those search entries whose terms most closely match the received query request; and
      identifying classifications of the selected search entries based on the hierarchy of classifications.

26. A method in a computer system for specifying relevance of search terms within a classification of data that is hierarchically classified, the method comprising:

providing a negative term for at least one classification;

receiving a query request having requested terms; and generating a result for the received query request wherein the one classification is not included in the result when the negative term is a requested term.

27. The method of claim 26 wherein sub-classifications of the one classification are not included in the result.

28. The method of claim 26 wherein the data represents items in an electronic catalog.

29. The method of claim 26 wherein the one classification is not included regardless of how well the one classification might otherwise satisfy the query request.

30. A method in a computer system for determining whether hierarchical classifications of data satisfy a query request, the method comprising:

providing a priority descriptor that specifies how to determine terms that are relevant to a classification;

determining terms that are relevant to classifications based on the priority descriptor; and identifying those classifications that most closely match the query request based on review of the determined terms for the classifications.

31. The method of claim 30 wherein the data represents items, wherein the computer system includes a description of the items and description of the classifications, and wherein the priority descriptor indicates how the terms are determined from the descriptions.

32. The method of claim 30 wherein the priority descriptor is stored in a file.

33. The method of claim 30 wherein the priority descriptor can be modified.

34. The method of claim 30 wherein the determined terms are stored in a term table before receiving the query request and wherein the identifying is performed by reviewing the term table.

35. A computer-readable medium containing instructions for causing a computer system to generate search results for items that are hierarchically classified, by a method comprising:

providing a hierarchy of classifications, for classifications within the provided hierarchy of classifications, identifying terms describing the items within that classification; and after the hierarchy of classifications is provided, receiving a search criteria;

selecting as initial search results those classifications whose identified terms most closely match the received search criteria; and adjusting the initial search results based on the hierarchy of classifications.

36. The computer-readable medium of claim 35 wherein the adjusting includes for each classification in the initial search results, removing all descendent classifications.

37. The computer-readable medium of claim 36 wherein a score is associated with each classification in the initial search results and the adjusting includes adjusting the score of a classification when a descendent classification is removed.

38. The computer-readable medium of claim 37 wherein the adjusting of the score sets the score to the highest score of a descendent classification.

39. The computer-readable medium of claim 35 wherein when a classification is not in the initial search results and child classifications are in the initial search results and surpass a threshold, removing the child classifications and adding the classification.

40. The computer-readable medium of claim 39 wherein a score is associated with each classification in the initial search results and wherein the added classification is given a score based on the scores of the child classifications.

41. The computer-readable medium of claim 40 wherein the given score is the highest score of the child classifications.

42. The computer-readable medium of claim 35 wherein the generating includes assigning a priority to each classification based on the source of the terms.

43. The computer-readable medium of claim 42 wherein the source of the terms includes the name of the classifications.

44. The computer-readable medium of claim 42 wherein the source of terms for leaf classifications includes a description of each item in the leaf classification.

45. The computer-readable medium of claim 35 wherein the adjusting of the initial search results include removing the classification that is selected based on negative terms for that classification.

46. The computer-readable medium of claim 35 wherein the generating includes retrieving item entries for the items within the classification and identifying the terms from the retrieved item entries.

47. The computer-readable medium of claim 35 wherein the generating includes for each classification, retrieving an indication of from where the terms are to be retrieved.

48. The computer-readable medium of claim 47 wherein some of the terms are retrieved from the names of the classifications.

49. The computer-readable medium of claim 47 wherein some of the terms are retrieved from descriptions of the items within the classification.

50. The computer-readable medium of claim 35 including displaying an indication of the classifications in the adjusted search results.

51. The computer-readable medium of claim 50 including receiving a selection of a displayed classification and displaying sub-classifications of the selected classification.

52. The computer-readable medium of claim 35 including receiving a selection of a displayed classification and displaying information describing items within the selected classification.

53. A computer-readable medium containing instructions for causing a computer system to query a hierarchically classified data, by a method comprising:

providing a hierarchy of classifications; and after the hierarchy of classifications is provided, identifying classifications of the data that may satisfy a query request;

displaying the identified classifications; and in response to selection of a displayed classification, displaying sub-classifications or displaying the data within the classification.

54. The computer-readable medium of claim 53 wherein the identified classifications include no sub-classifications of an identified classification.

55. The computer-readable medium of claim 53 wherein when sufficient sub-classifications of a classification may satisfy the received query request, identifying the classification rather than the sub-classifications.

56. The computer-readable medium of claim 55 wherein classifications have scores based on how well they may satisfy the query request and the classification that is identified rather than the sub-classifications is assigned a score based on the score of its sub-classifications.

57. The computer-readable medium of claim 53 wherein the data represents items in an electronic catalog.

58. The computer-readable medium of claim 53 wherein the data represents terms that may be purchased.

59. The computer-readable medium of claim 53 including:
- for classifications within the hierarchy of classifications, generating a search entry containing terms describing the data within that classification; and wherein the identifying includes:
- selecting as initial query results those search entries whose terms most closely match the received query request; and identifying classifications of the selected search entries based on the hierarchy of classifications.

\* \* \* \* \*